(12) United States Patent
Olaru

(10) Patent No.: US 7,156,648 B2
(45) Date of Patent: Jan. 2, 2007

(54) INJECTION NOZZLE WITH PLANAR HEATER

(75) Inventor: George Olaru, Toronto (CA)

(73) Assignee: Mold-Masters Limited, Georgetown (CA)

( * ) Notice: Subject to any disclaimer, the term of this patent is extended or adjusted under 35 U.S.C. 154(b) by 231 days.

(21) Appl. No.: 10/701,493

(22) Filed: Nov. 6, 2003

(65) Prior Publication Data

US 2004/0091566 A1   May 13, 2004

Related U.S. Application Data

(60) Provisional application No. 60/424,004, filed on Nov. 6, 2002.

(51) Int. Cl.
*B29C 45/20* (2006.01)

(52) U.S. Cl. .................................. 425/549; 264/328.15

(58) Field of Classification Search ................ 425/549; 264/328.15
See application file for complete search history.

(56) References Cited

U.S. PATENT DOCUMENTS

| | | | |
|---|---|---|---|
| 2,797,296 A | 6/1957 | Fowler et al. | |
| 3,370,156 A | 2/1968 | Graves | |
| 3,647,532 A | 3/1972 | Friedman | |
| 3,730,373 A | 5/1973 | Kozbelt | |
| 3,808,573 A | 4/1974 | Cappell | |
| 3,812,323 A | 5/1974 | Pink | |
| 3,829,657 A | 8/1974 | Hinz | |
| 3,872,281 A | 3/1975 | Krieg et al. | |
| 4,058,704 A | 11/1977 | Shimizu | |
| 4,203,198 A | 5/1980 | Hackett et al. | |
| 4,286,377 A | 9/1981 | Hurko et al. | |
| 4,492,555 A | 1/1985 | Schulte | |
| 4,793,795 A | 12/1988 | Schmidt et al. | |
| 4,856,979 A | 8/1989 | Schreck | |
| 4,859,835 A | 8/1989 | Balderson | |
| 4,892,474 A | 1/1990 | Gellert | |
| 4,923,387 A | 5/1990 | Gellert | |
| 4,999,049 A | 3/1991 | Balderson et al. | |
| 5,411,392 A | 5/1995 | Von Buren | |
| 5,464,343 A | 11/1995 | Hepler | |
| 5,504,304 A | 4/1996 | Noguchi et al. | |
| 5,587,188 A | 12/1996 | Hepler | |
| 5,955,120 A | 9/1999 | Deissler | |
| 5,973,296 A | 10/1999 | Juliano et al. | |
| 5,980,236 A | 11/1999 | Gellert et al. | |
| 6,043,467 A | 3/2000 | Little | |
| 6,305,923 B1 * | 10/2001 | Godwin et al. | ............. 425/549 |
| 6,341,954 B1 | 1/2002 | Godwin et al. | |

(Continued)

FOREIGN PATENT DOCUMENTS

CA    2 383 481 A1    3/2001

(Continued)

OTHER PUBLICATIONS

Search Report from European Application No. 03025483, 5 pages, dated Jan. 23, 2004.

(Continued)

*Primary Examiner*—Tim Heitbrink

(57) ABSTRACT

A system and method for making molded parts that include one or more planar heaters coupled, secured, or releaseably secured to one or more sides of each of the one or more nozzles. The releasably secure coupling allows heater device to be visually inspected, tested, removed, and/or replaced. The planar heater device can have a support device patterned with an electrical resistive path. The electrical resistive path can include any pitch or number of electrical resistance lines, such that a longitudinal uniform heat profile is generated along a melt flow channel of the one or more nozzles when the nozzles are in use.

21 Claims, 6 Drawing Sheets

U.S. PATENT DOCUMENTS

| | | |
|---|---|---|
| 6,390,803 B1 | 5/2002 | Christen |
| 6,394,784 B1 * | 5/2002 | Gellert et al. ............... 425/549 |
| 6,405,785 B1 | 6/2002 | Gellert et al. |
| 6,409,497 B1 | 6/2002 | Würstlin |
| 6,575,729 B1 | 6/2003 | Godwin et al. |
| 6,619,948 B1 | 9/2003 | Günther |
| 6,764,297 B1 | 7/2004 | Godwin et al. |
| 6,805,549 B1 | 10/2004 | Günther |
| 6,960,072 B1 * | 11/2005 | Hepler ....................... 425/549 |
| 2002/0102322 A1 | 8/2002 | Gunther |
| 2003/0003188 A1 | 1/2003 | Gunther |

FOREIGN PATENT DOCUMENTS

| | | |
|---|---|---|
| CA | 2 413 256 A1 | 12/2001 |
| DE | 35 01 840 A1 | 7/1986 |
| DE | 35 05 658 A1 | 8/1986 |
| DE | 197 23 374 A1 | 12/1997 |
| DE | 199 41 038 A1 | 3/2001 |
| DE | 100 04 068 A1 | 8/2001 |
| EP | 0 402 501 A1 | 12/1990 |
| EP | 0 670 209 A1 | 9/1995 |
| EP | 1 223 017 A1 | 7/2002 |
| WO | WO 82/00935 | 3/1982 |
| WO | WO 01/54882 A1 | 8/2001 |
| WO | WO 01/98054 A1 | 12/2001 |

OTHER PUBLICATIONS

Patent Abstracts of Japan, Publication No. 2000218671, published Aug. 8, 2000, 1 page.

Stamm, A., "Mikro-Flachdüse für kleine Nestabstände," Plastverarbeiter, vol. 53, Nr. 6, p. 34, Zechner Und Huethig Vertag GmbH, 2002.

English Abstract for German Patent No. DE3501840, published Jul. 24, 1986, 1 page, from http://vs.espacenet.com.

English Abstract for German Patent No. DE3505658, published Aug. 21, 1986, 1 page, from http://vs.espacenet.com.

English Abstract for German Patent No. DE19723374, published Dec. 18, 1997, 1 page, from http://vs.espancenet.com.

English Abstract for European Patent No. EP1223017, published Jul. 17, 2002, 1 page, from http://vs.espacenet.com.

* cited by examiner

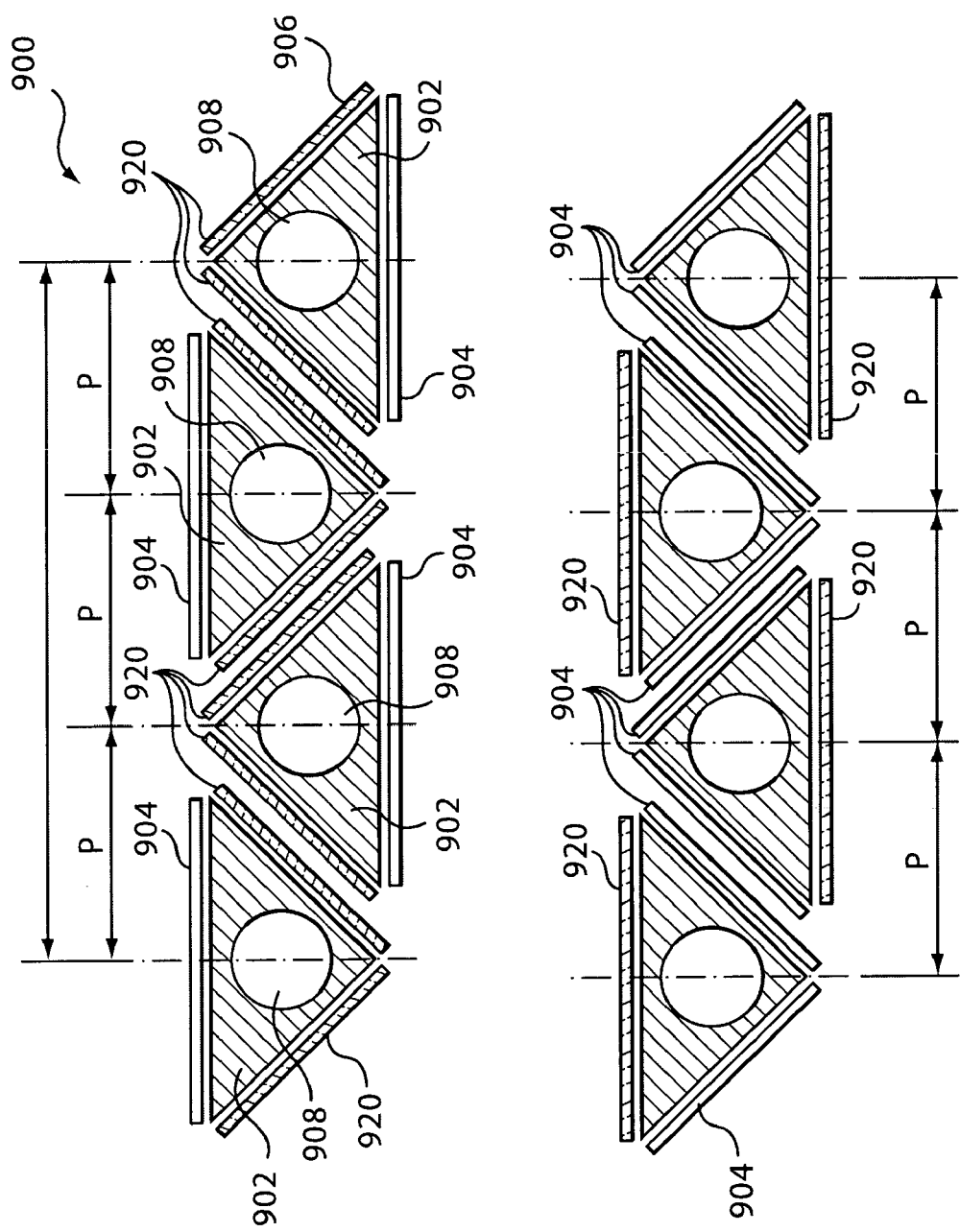

INJECTION NOZZLE WITH PLANAR HEATER

CROSS-REFERENCE TO RELATED APPLICATIONS

This application claims benefit under 35 U.S.C. § 119(e) to U.S. Provisional Application No. 60/424,004, filed Nov. 6, 2002, entitled "Injection Nozzle With Planar Heater," which is incorporated by reference herein in its entirety.

BACKGROUND OF THE INVENTION

1. Field of the Invention

The present invention is related to heating and heaters for injection nozzles, more particularly for injection nozzles used in injection molding applications.

2. Background Art

Nozzles, nozzle arrays, and micro nozzle arrays can be used for many applications. One application is injection molding. An injection molding operation ideally maintains a constant or consistent viscosity and speed of a melt stream of moldable material through the one or more nozzles. When the viscosity and speed of the melt stream is maintained at a constant value items that are uniform in appearance can be produced. One way to control or maintain the viscosity and ideal melt stream speed is to have uniform heating along a nozzle channel in each nozzle used to form the item.

In a nozzle having a circular cross-section, a heating device can include a helical coil wrapped around a cylindrical nozzle body.

FIG. 13 shows a conventional nozzle 1302. In a nozzle 1302 having a non-circular cross-section, heating can be accomplished by inserting a heating rod 1304 alongside an entire length of nozzle channel 1308. Heating rod 1304 is secured within a housing 1302 that includes the nozzle channel 1308. This arrangement produces an almost ideal consistency in viscosity and melt stream speed. However, because heat transfer occurs along only one side of the nozzle channel 1308 and a small surface area of the rod 1304 is adjacent the nozzle channel 1308, there are still some areas of the melt stream that have varying viscosity and flow speeds. This is especially true when using small or tight pitch between nozzles 1302.

Some examples of flat nozzles are those manufactured by Mold Masters® Limited, Gunther Hotrunner Systems, and Heitec. An exemplary flat nozzle is found in U.S. Pat. No. 4,923,387 ("the '387 patent"), which shows an electrical heater plate connected to a nozzle. The outer shape of the nozzle is not defined. Another exemplary flat nozzle is found in U.S. Pat. No. 4,793,795 ("the '795 patent") that shows a flat nozzle heated by a coiled heater, where the heater is embedded in the cylindrical surface of the flat nozzle. In the '387 and '795 patents, which are assigned to the assignee of the current invention, the heating element of the heater is a coiled wire that is a three dimensional (3D) structure occupying a rather significant space around or inside the nozzle. This makes the nozzles shown in the '387 and '795 patents somewhat bulky and impractical for inside gating and small pitch applications. Both of these documents are incorporated herein by reference in their entirety.

Small pitch nozzles having all flat lateral surfaces are shown in DE 19723374 ("the DE '374 document") to Drach, which published on Dec. 18, 1997, and is assigned to Heitec Heisskanaltechnik GmbH, which is incorporated by reference herein in its entirety. In order to eliminate the impact of the heater on the nozzle size along one direction, the DE '374 document shows a nozzle having a rectangular body, a melt channel, and a tubular heater located along only one side of the melt channel. Placing the cylindrical coiled heater lateral with respect the melt channel increases the size of the nozzle along one direction and limits the size of the nozzle along the other direction.

A similar rectangular nozzle is shown in U.S. Published Patent Application No. 2002/0102322 A1 to Gunther ("the '322 PPA"), which published on Aug. 1, 2002, which is incorporated by reference herein in its entirety. The '322 PPA places the cylindrical heater along one side of the melt channel. Similar to the DE '374 document, the '322 PPA increases the size of the nozzle along one direction making it impractical for internal gating of small parts. This is because the DE '374 document and the '322 PPA provide cylindrical or 3D heating devices. These heating devices also provide a nonuniform heat profile along the nozzle melt channel.

The use of cylindrical 3D thin and thick film heaters for inside gating and small tight pitch applications may be achieved by the nozzle designs shown in U.S. Pat. No. 6,305,923 to Godwin et al. and U.S. Pat. No. 6,341,954 to Godwin et al., which are both assigned to Husky Injection Molding Systems Ltd. Similar round nozzles having 3D layered heater elements are disclosed in the U.S. Pat. No. 5,504,304 to Noguchi, U.S. Pat. No. 5,973,296 to Juliano, and WO 01/17317 to Gunther. All these patents are incorporated herein by reference in their entirety, and teach various 3D layered resistive heating elements, which provide a compact design. Nevertheless making layered resistive heating elements on a cylindrical or 3D surface is on one hand a time consuming method and on the other hand is a method that cannot be applied to manufacture simultaneously a large number of heating elements in batches that deliver heaters having the same geometrical and functional characteristics. The use of a flat heating means permanently attached to a flat nozzle is taught by U.S. Published Patent Application 2003/0003188 A1 to Gunther ("the '188 PPA"), which is incorporated by reference herein in its entirety. However, the '188 PPA requires the heater device to be permanently coupled to the flat nozzle, which increases maintenance and replacement costs if the heater or nozzle were to fail.

Therefore, what is needed is a planar heater device or flexible planar heater device that is easily removable from a nozzle having at least one flat outer surface and that maintains consistency of viscosity and flow rates for a melt stream flowing through the nozzle.

BRIEF SUMMARY OF THE INVENTION

Embodiments of the present invention provide a system including one or more nozzles having at least one flat outer surface and a releaseably securable patterned planar heater (e.g., rigid, flexible, film, etc.) device coupled to the one or more flat nozzles. The one or more flat nozzles can have at least one flat outer surface and one curved outer surface, a square cross-section, a rectangular cross-section, or a triangular cross-section. The planar heater device can include an electrical resistive path patterned on a support device. The patterned resistive path can be configured to generate a longitudinal uniform heat profile along a melt flow channel. The planar heater device can be coupled to one or more sides and one or more sections of each of the one or more nozzles.

Other embodiments of the present invention provide a method of manufacturing including producing a sheet including one or more patterned planar heater devices, removing a portion of the sheet corresponding to a size of one or more flat nozzles, and releasably coupling the portion of the sheet to the one or more flat nozzles. The method can also include patterning an electrical resistive path on each of the one or more patterned planar heater devices. The method can also include using the electrical resistive path to generate a longitudinal uniform heat profile along a melt flow channel of the one or more flat nozzles.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 1 and 2 show side views of various exemplary nozzle and heater arrangements according to embodiments of the present invention.

FIGS. 3, 4, 5, and 6 show various cross-sectional views of nozzles according to various embodiments of the present invention.

FIGS. 9 and 10 show cross-sectional views of exemplary sets of nozzles having planar heaters according to an embodiment of the present invention.

Figure 2:
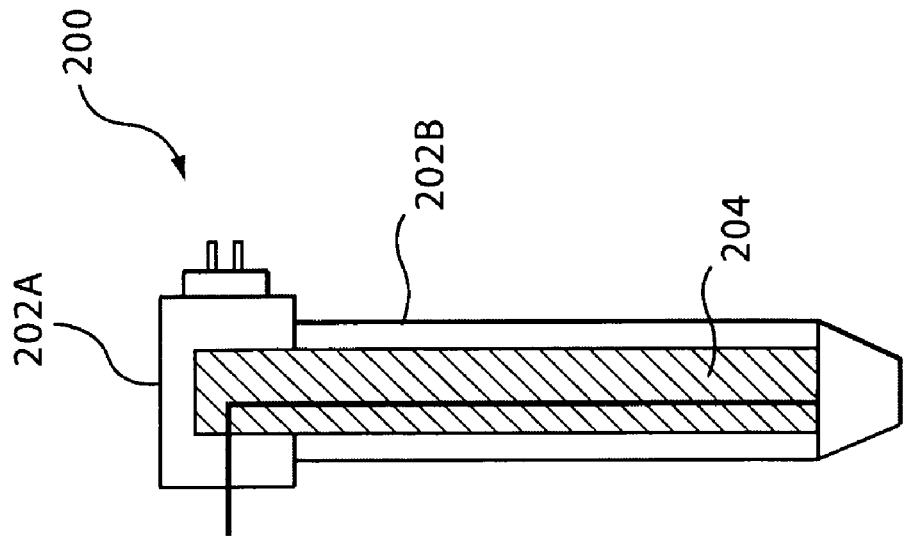

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Overview

Embodiments of the present invention provide a system and method including one or more planar heater devices (e.g., rigid, flexible, thin or thick film, etc.) that are coupled, secured, or releaseably secured (hereinafter, all are referred to as "coupled") to one or more sides of one or more nozzles (e.g., flat nozzles). The coupling can be done through use of adhesives, coupling devices, securing devices, and the like (hereinafter, all are referred to as "coupling devices"). These coupling devices can provide for visual inspection, testing, removal, and/or replacement of the planar heater device. Thus, in contrast to conventional systems that have a heating rod housed inside a housing that also includes a nozzle, the planar heater device is accessible and easily removable and replaceable, if an embodiment or specification of an application so requires these functions.

In another aspect of the embodiments of the present invention the planar heater device can have a support device (e.g., a dielectric support) patterned with an electrical resistive path. The electrical resistive path can include any pitch or number of electrical resistance lines, such that a longitudinal uniform heat profile is generated along a melt flow channel of the one or more nozzles.

The planar heater device according to embodiments of the present invention can be any flexible or rigid planar heater, such as, but not limited to: resistive heaters, printed circuit heaters, kapton heaters, silicon rubber heaters, mica heaters, geometric heaters, wound wire element heaters, etched foil heaters, ceramic heaters, stamped foil heater, conductive ink heaters, thin film heaters, stainless steel heaters, thermo foil heaters, band heaters, and the like. These heaters can be ones manufactured by: Advanced Ceramics Corporation, Minco, Ogden, Carlton Industrial Controls Ltd., Translogic Incorporated, Tayco, Johanson Companies, Watlow, Fast Heat, Seiki Corporation of the Mitsui Group, Kyocera, among other global companies.

Planar Heater(s) and Nozzle Arrangements

Figure 1:
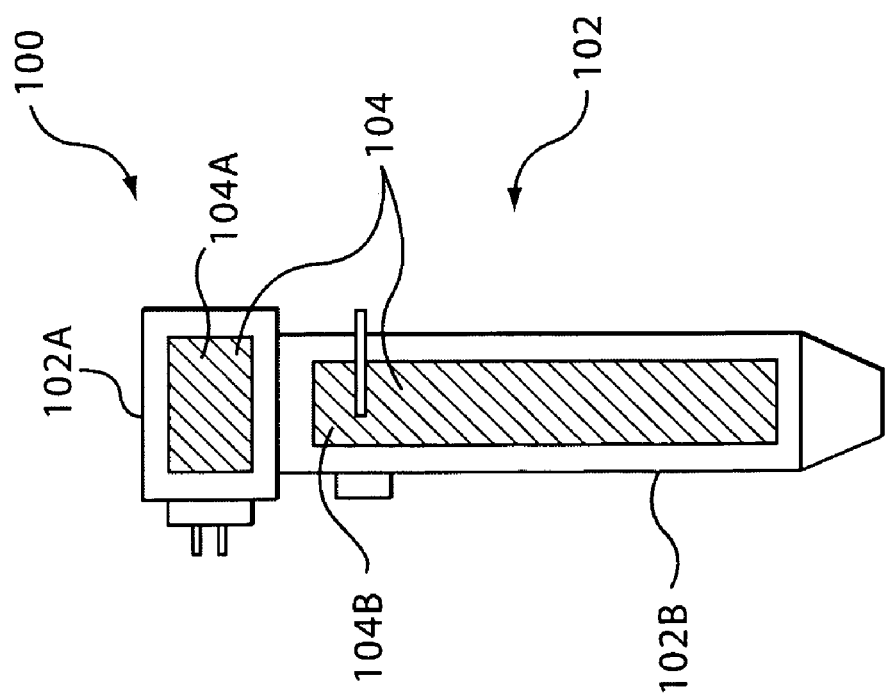

FIG. 1 shows a system 100 according to embodiments of the present invention. System 100 can be in an injection molding application that forms injection-molded items from melted resins. System 100 includes a nozzle 102 (e.g., a flat nozzle) and a releaseably securable heater device 104 (e.g., a planar heater device, for example rigid, flexible, thin or thick film, etc. heater device)). As discussed above, heater device 104 can be secured using any known securing or coupling devices that allow it to be easily removed and replaced.

Heater device 104 can include a first heater portion 104A and a second heater portion 104B. First heater portion 104A can be used to heat a first section 102A (e.g., nozzle head) of nozzle 102 and second heater portion 104B can be used to heat a second section 102B (e.g., nozzle body) of nozzle 102. Through use of heater device 104, a larger heater surface area is adjacent a flow channel (not shown) running longitudinally through nozzle 102 than in conventional systems. It is to be appreciated in one embodiment heater device 104 can be coupled to first and second opposite sides of nozzle 102, which can increase heat and uniformity of heat across the entire flow channel. Thus, using heater device 104 of this arrangement material flowing through the flow channel can have a relatively high level of consistency in viscosity and flow rate.

FIG. 2 shows a system 200 according to embodiments of the present invention. System 200 is similar in function to system 100. A main difference between systems 200 and system 100 is that system 200 includes heater device 204 that is configured to cover both a nozzle head 202A and a nozzle body 202B as a single unit.

FIGS. 3, 4, 5, and 6 show various cross-sectional views of nozzles 300, 400, 500, and 600 according to various embodiments of the present invention. It is to be appreciated that nozzles 100 and 200 can include any of the cross-sections of FIGS. 3–6.

Figure 3:
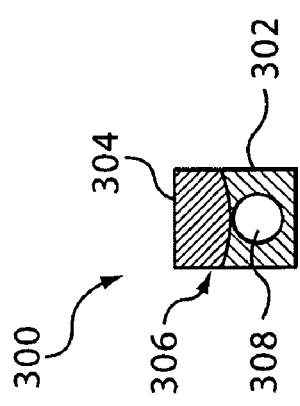

FIG. 3 shows a cross-sectional view of nozzle 300 according to an embodiment of the present invention. Nozzle 300 includes a nozzle body 302 having at least one curved (e.g., substantially planar) side or surface 306 (e.g., convex (curving towards a melt channel 308), concave (curving away from a melt channel 308), etc.). In a first embodiment, heater device 304 can be a rigid planar heater coupled a distance from curved side 306 adjacent one side of nozzle channel 308. In a second embodiment, heater device 304 can be either a flexible planar heater or a planar heater having a curved shape that is coupled against curved side 306 adjacent one side of nozzle channel 308. In these arrangements, a larger surface area of nozzle channel 308 is heated by planar heater 304 than in conventional systems to maintain viscosity and speed of a melt stream (not shown). Also, in the second embodiment, if a curved heater device 304 is used the shape can be used to "lock" heater device 304 into curved side 306, which can allow for a reduction in slippage.

Figure 4:
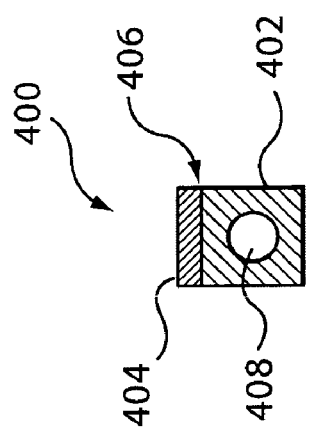

FIG. 4 shows a cross-sectional view of nozzle 400 according to an embodiment of the present invention. Nozzle 400 includes a heater device 404 coupled to a side 406 of nozzle body 402 (e.g., a square or rectangular shaped nozzle body) adjacent nozzle channel 408. In this arrangement, a larger surface area of nozzle channel 408 is heated by planar heater 404 than in conventional systems to maintain viscosity and speed of a melt stream (not shown).

Figure 5:
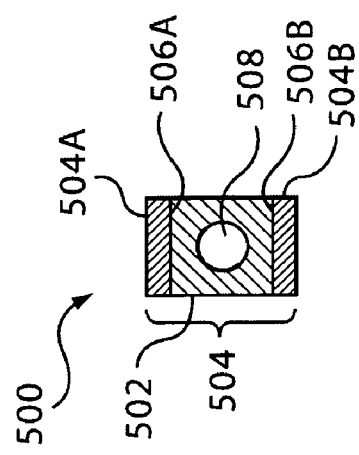

FIG. 5 shows a cross-sectional view of nozzle 500 according to an embodiment of the present invention. Nozzle 500 includes a nozzle body 502 (e.g., a square or rectangular nozzle body) having at least first and second opposite sides 506A and 506B, respectively. A heater device 504 has at least a first portion 504A coupled to first side 506A and a second portion 504B coupled to second, opposite side 506B of nozzle body 502, so that they are positioned adjacent nozzle channel 508. In this arrangement, a larger surface area of nozzle channel 508 is heated using heater device 504 than in conventional systems and in systems including nozzles 300 and 400, discussed above, to maintain viscosity and speed of a melt stream (not shown).

Figure 6:
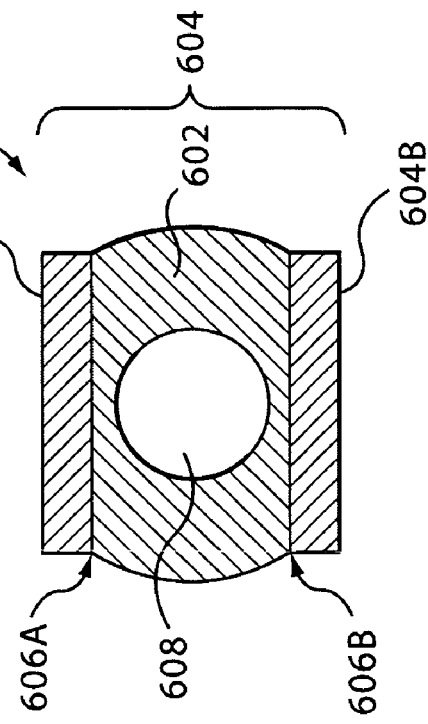

FIG. 6 shows a cross-sectional view of nozzle 600 according to an embodiment of the present invention. Nozzle 600 includes a nozzle body 602 (e.g., partially circular and partially flat nozzle body) having first side 606A and second, opposite side 606B. A heater device 604 includes first portion 604A and second portion 604B. First portion 604A is coupled to first side 606A and second portion 604B is coupled to second side 606B, so that first and second portions 604A and 604B are adjacent nozzle channel 608. In this arrangement, similar to nozzle 500, a larger surface area of nozzle channel 608 is heated by planar heater 604 than in conventional systems, and systems 300 and 400, to maintain viscosity and speed of a melt stream (not shown).

It is to be appreciated that heater devices 304, 404, 504, and/or 604 can be releaseably coupled to sides 306, 406, 506A/B, and/or 606A/B, as is discussed above. This can provide for visual inspection, easy testing, removal, and/or replacement of heater device 304, 404, 504, and/or 604.

Sets of Nozzle and Planar Heater Arrangements

Figure 7:
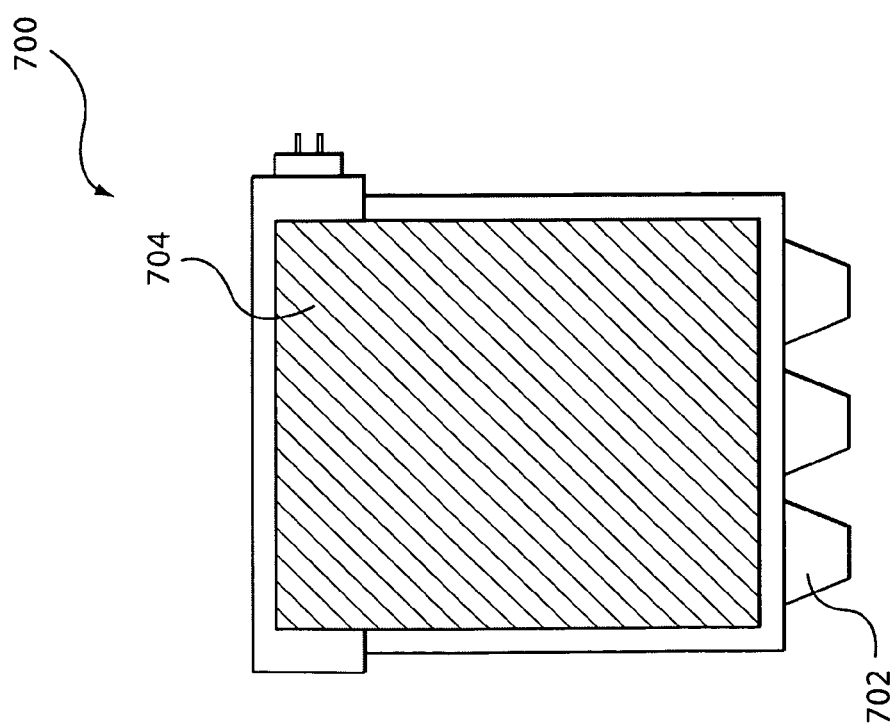
FIG. 7 shows a side view of an exemplary set of nozzles having a single heater arrangement according to an embodiment of the present invention.

FIG. 7 shows a system 700 according to an embodiment of the present invention. System 700 includes a portion having Z nozzles 702 (e.g., Z is an integer greater than 1, for example Z=3). In one embodiment, nozzles 702 can be a thermal gated nozzle array. An appropriately sized heater device 704 is coupled to nozzles 702 to form a uniform heat profile longitudinally along nozzles 702. Heater device 704 can be similar in arrangement and operation to the heater devices discussed above.

Figure 8:
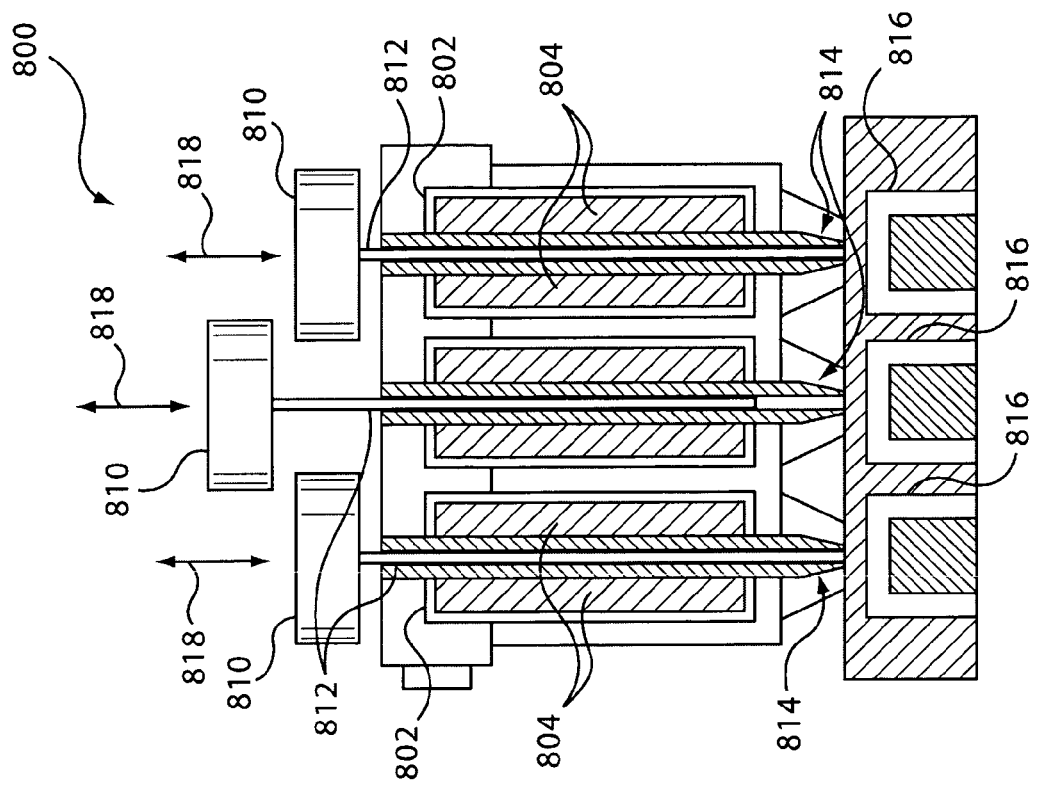
FIG. 8 shows a side view of an exemplary set of nozzles having a multiple heater arrangement according to an embodiment of the present invention.

FIG. 8 shows a cross-sectional view of a system 800 according to an embodiment of the present invention. System 800 includes a portion having Z nozzles 802 (e.g., Z=3). Nozzles 802 can be valve-gated nozzles having pistons 810 coupled to valve pins 812 that seat and unseat in valve gates 814. Seating and unseating of pins 812 into and out of valve gates 814 can control a flow of melt material (not shown) (e.g., liquid resin) into a mold cavity 816. The seating and unseating of pins 812 can be controlled using pistons 810, which move in the directions of arrows 818. Individual ones of heater device 804 are coupled to respective nozzles 802. Heater devices 804 can be similar in arrangement and operation to the heater devices discussed above.

Thus, FIGS. 7 and 8 illustrate a set of nozzles 702 or 802 (e.g., a nozzle array) being heated by a heater device 704 or set of heater devices 804, according to various embodiments of the present invention. Arrays of heater devices 704 or 804 can be manufactured in long sheets (not shown) (e.g., 100 feet, 1000 feet, etc.). Then, when a particular injection molded item is requested by a customer, a predetermined number of nozzles 702 or 802 can be chosen that will fulfill the specification required. Once an amount of nozzles 702 or 802 has been chosen, a portion of the sheet of heater devices 704 or 804 needed to cover the number of nozzles is cut or otherwise removed from the sheet. Once removed, the portion or portions of the sheet is releaseably coupled to one or more side (surfaces) of nozzles 702 or 802.

In one example, which is merely an illustration and not meant to be limiting, a manufacturing process can produce 100 foot sheeting including arrays of heater devices 704 or 804. When a customer orders an item to be produced that requires 5 nozzles, a portion of the sheet corresponding to a length for 5 nozzles is removed. This removal can be aided through perforating the sheet at various intervals, for example at 5 or 10 nozzle length increments. Therefore, using the above described methods and arrangements, manufacturing time and shipment time for the customer's order can be substantially reduced.

FIG. 9 shows a cross-section view of a system 900 according to an embodiment of the present invention. System 900 includes nozzles 902 having heater devices 904 and a coating 920 (e.g., insulation coating) coupled to one or more sides 906. In this embodiment, nozzles 902 can be tri-face nozzles. It is to be appreciated that each nozzle 902 can have one, two, or three heater devices 904 and one, two, or three coatings 920, respectively. Nozzles 902 also include nozzle channels 908. It also is to be appreciated that any number of nozzles can be included in system 900 based on the specifications of an end-user.

With continuing reference to FIG. 9, a pitch P is shown, which is the spacing between longitudinal axes of adjacent nozzles 902. When more than one nozzle 902 is used, one preferable arrangement results in a tight pitch or small pitch system, as would be apparent to one of ordinary skill in the art from reading this description. Using heater devices 904, pitch P for system 900 can be substantially smaller than conventional systems, while maintaining a longitudinally uniform profile.

Figure 10:
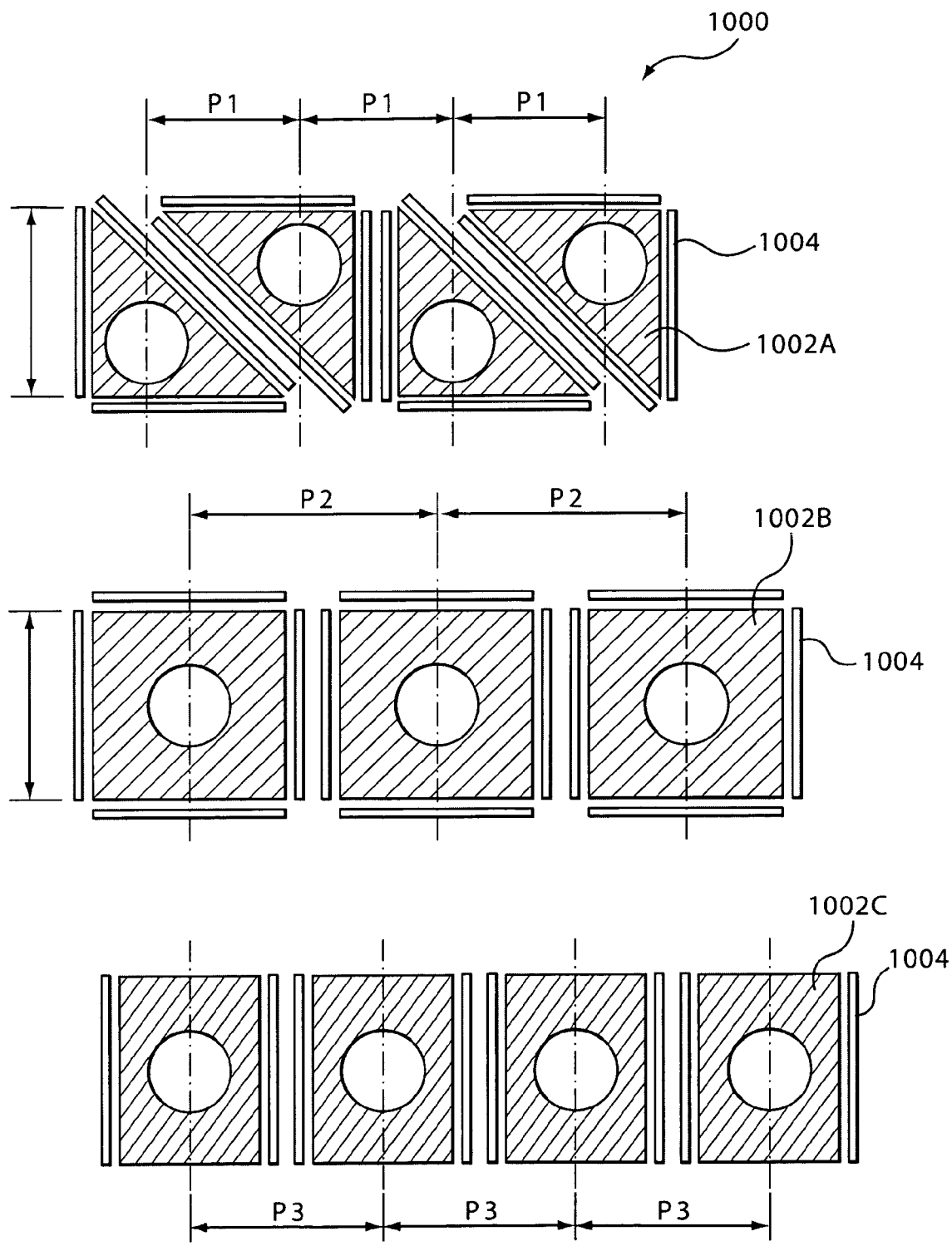

FIG. 10 shows a cross-sectional view of system 1000 according to an embodiment of the present invention. System 1000 can include up to three shapes of nozzles 1002A/B/C. For example, nozzles 1002A can be tri-surface nozzles, nozzles 1002B can be square nozzles, and nozzles 1002C can be rectangular nozzles. When arranged as shown in this one embodiment, a spacing of nozzles 1002A results in pitch P1, a spacing of nozzles 1002B results in pitch P2, and a spacing of nozzles 1002C results in pitch P3. Each of these pitches, P1, P2, and/or P3, can yield a tight pitch or small pitch arrangement, as would be apparent to a skilled artisan upon reading this description. Nozzles 1002A, 1002B, and 1002C can be releasably coupled to between one and four, as appropriate, heater devices 1004.

Exemplary System with Multiple Heater Devices

Figure 11:
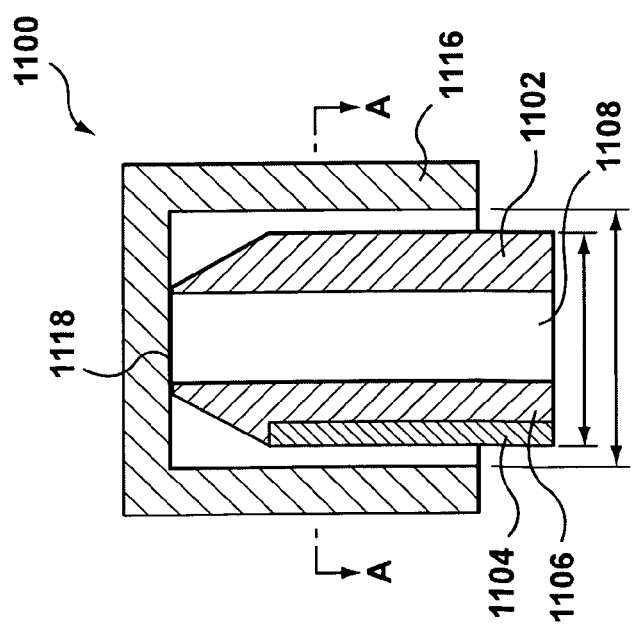
FIG. 11 shows a cross-sectional view of an exemplary nozzle according to an embodiment of the present invention.

FIG. 11 shows a cross-sectional view of a system 1100 according to an embodiment of the present invention. System 1100 includes a nozzle 1102 having up to four heater devices 1104 (see FIG. 12, heater devices 1104A–D) releaseably coupled to first through fourth sides or walls 1106 (see FIG. 12, sides or walls 1106A–D). A nozzle channel or melt channel 1108 runs longitudinally through nozzle 1102, such that a melt flow (not shown) is transmitted to mold cavity 1116 through tip 1118 of nozzle 1102.

Figure 12:
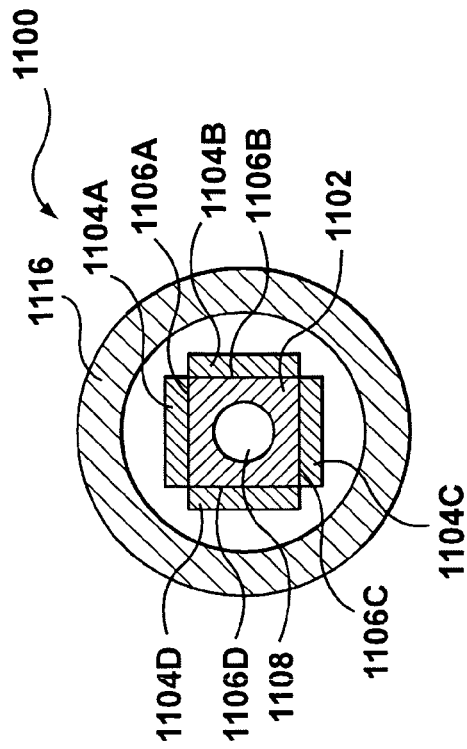
FIG. 12 shows a cross-sectional view of the nozzle in FIG. 11 looking into line A—A in FIG. 11.
Figure 13:
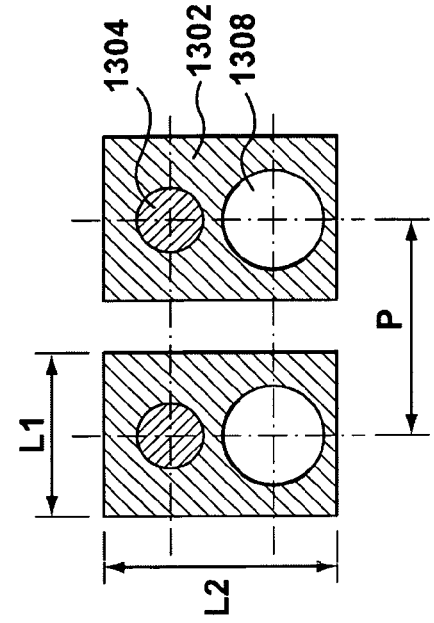
FIG. 13 shows a cross-sectional view of a conventional nozzle and heater arrangement.

FIG. 12 shows a cross-section of system 1100 looking into line A–A. As seen in this view, sides 1106A–D of nozzle 1102 have heater devices 1104A–D coupled thereto.

It is to be appreciated that other arrangements of a planar heater and nozzle are contemplated within the scope of the present invention. Also, the planer heater can be located on any face of the nozzle and if one face does not have a heater, it can have a layer of thermally insulated material such as ceramic. The film heater in some cases can be covered by a thermally insulated coating.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An injection molding system configured to make molded parts, comprising:
   one or more nozzles having at least one substantially flat outer surface; and
   a releaseably securable patterned substantially planar heater device comprising,
   a support device, and
   an electrical resistive path patterned on the support device,
   wherein the planar heater device is releasably secured to the at least one substantially flat outer surface of the one or more flat nozzles.

2. The system of claim 1 wherein the support device comprises a dielectric support device.

3. The system of claim 1 wherein the patterned resistive path is configured to generate a longitudinal uniform heat profile along a melt flow channel.

4. The system of claim 1, wherein the heater device comprises one or more individual planar heaters coupled to individual ones of the one or more nozzles.

5. The system of claim 1, wherein the heater device comprises one or more individual planar heaters coupled to one or more sections of individual ones of the one or more nozzles.

6. The system of claim 1, wherein the planar heater device is coupled to a side of the one or more nozzles.

7. The system of claim 1, wherein the planar heater device comprises:
   a first portion coupled to a first side of the one or more nozzles; and
   a second portion coupled to a second, opposite side of the one or more nozzles.

8. The system of claim 1, wherein the planar heater device comprises:
   a first portion coupled to a head portion of the one or more nozzles; and
   a second portion coupled to a body portion of the one or more nozzles.

9. The system of claim 1, wherein the planar heater device comprises:
   first and second portions coupled to opposite sides of a head portion of the one or more nozzles; and
   third and fourth portions coupled to opposite sides of a body portion of the one or more nozzles.

10. The system of claim 1, wherein the planar heater device comprises a rigid planar heater.

11. The system of claim 1, wherein the planar heater device comprises a flexible planar heater.

12. The system of claim 1, wherein the planar heater device comprises a film heater.

13. The system of claim 1, wherein the one or more nozzles comprises one or more flat micro nozzles.

14. The system of claim 1, wherein the one or more nozzles comprise at least one flat outer surface and one curved outer surface.

15. The system of claim 1, wherein the one or more nozzles comprise a square cross-section.

16. The system of claim 1, wherein the one or more nozzles comprise a rectangular cross-section.

17. The system of claim 1, wherein the one or more nozzles comprise a triangular cross-section.

18. The system of claim 1, wherein the planar heater device comprises one of a flexible or rigid film heater.

19. The system of claim 18, wherein the film heater comprises one of a thick film heater and a thin film heater.

20. The system of claim 1, wherein the electrical resistive path is a printed circuit, a conductive ink, a stamped foil, or an etched foil.

21. The system of claim 1, wherein the planar heater device is releasably secured to a plurality of the at least one flat outer surfaces of a corresponding plurality of the at least one nozzles.

* * * * *